No. 830,842. PATENTED SEPT. 11, 1906.
C. A. MAKOWSKI.
STALL.
APPLICATION FILED APR. 16, 1906.
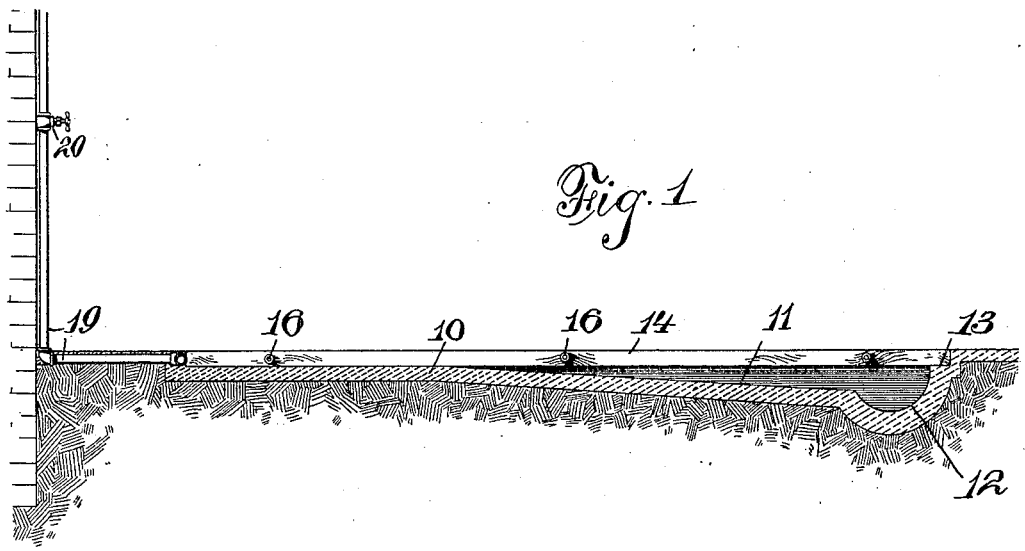
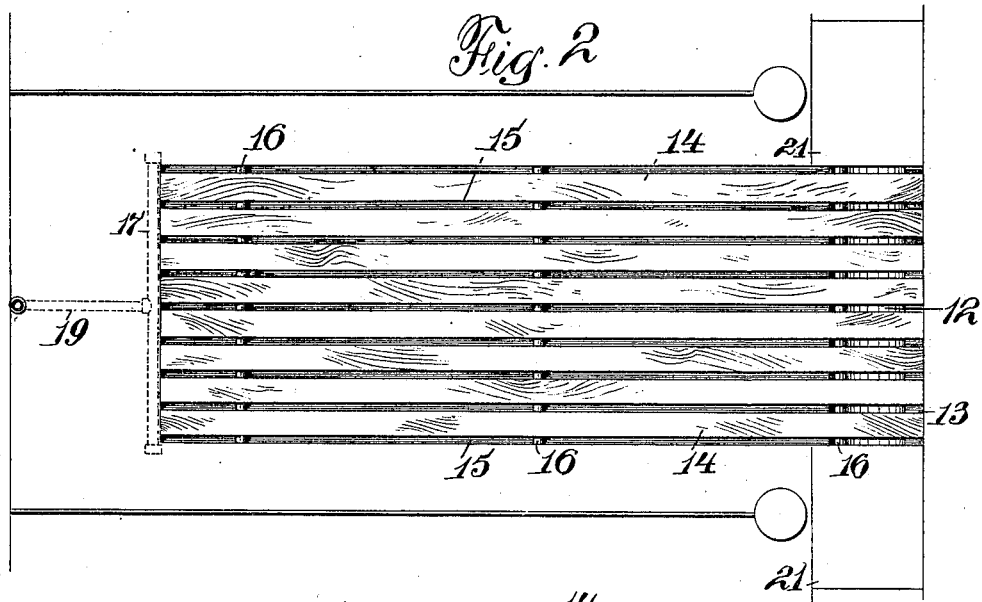
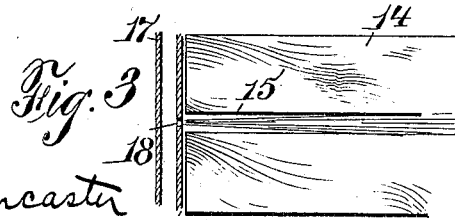
WITNESSES:
Ralph Lancaster
E. A. Pell
INVENTOR
Charles A. Makowski
BY
Wm. H. Campfield
ATTORNEY

UNITED STATES PATENT OFFICE.

CHARLES A. MAKOWSKI, OF NEWARK, NEW JERSEY.

STALL.

No. 830,842.

Specification of Letters Patent.

Patented Sept. 11, 1906.

Application filed April 16, 1906. Serial No. 311,885.

*To all whom it may concern:*

Be it known that I, CHARLES A. MAKOWSKI, a citizen of the United States, residing at Newark, in the county of Essex and State of New Jersey, have invented certain new and useful Improvements in Stalls; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a stall for animals, and particularly for horses, that is designed to provide a sanitary stall that is easily cleaned and one that can be flushed when desired without removing any of the stall.

The slats in the floor of the stall, however, can be removed, if necessary, and they are so arranged that they provide a level surface for the animal, which is desirable, and at the same time proper drainage is insured to keep the place dry.

The invention is illustrated in the accompanying drawings, in which—

Figure 1 is a vertical section, and Fig. 2 is a top plan view, of the improved stall; and Fig. 3 is a detail of the construction.

In the drawings, 10 shows a bottom of the stall, made, preferably, of cement or similar material, this bottom portion being straight or level on the front part of the stall and then sloping downward, as at 11, and then forming the trough 12, this terminating in the shoulder-piece 13 before it merges with the floor-line of the building. Arranged to extend from the flat portion 10 to the offset 13 is a series of slats 14, which are formed with the spaces 15 between them, which space can be maintained by the buttons 16 or any equivalent means.

The slats are preferably made of wood, although other material might be employed, and they form a level surface for the horse above the inclined portion 11 and the trough 12. This trough might be extended along the backs of a number of stalls to drain them all, and between the stalls it might be covered by the plates 21. (Shown in Fig. 2.)

Transversely arranged in the stall slightly below its surface is arranged the pipe 17, which has the perforations 18 (shown more particularly in Fig. 3) in line with the spaces 15 between the slats 14. A pipe 19 feeds this transverse pipe 17, and a faucet 20 can be installed to regulate the supply of water.

It will thus be seen that when it is desired to flush the stall all that is necessary to do is to turn on the water through the faucet 20 and allow it to run until the stall is entirely cleaned, and the water is again shut off.

Having thus described my invention, what I claim is—

A stall comprising a bottom formed with a recess, said recess being flat on its forward half and sloping downward and forming a trough at the back, a series of slats arranged in the recess and having their front portions resting directly on the floor of the recess and the rear ends of the slats resting on the back of the trough, whereby the front end of the stall-floor forms a series of channels, means for spacing the slats apart, a transverse water-pipe at the head of the slats and having a perforation in line with each channel, and a supply-pipe for the transverse pipe.

In testimony that I claim the foregoing I have hereunto set my hand this 14th day of April, 1906.

CHARLES A. MAKOWSKI.

Witnesses:
   E. A. PELL,
   WM. H. CAMFIELD.